J. E. HAIL.
HARVESTING MACHINE.
APPLICATION FILED DEC. 30, 1909.
968,655.
Patented Aug. 30, 1910.
6 SHEETS—SHEET 1.
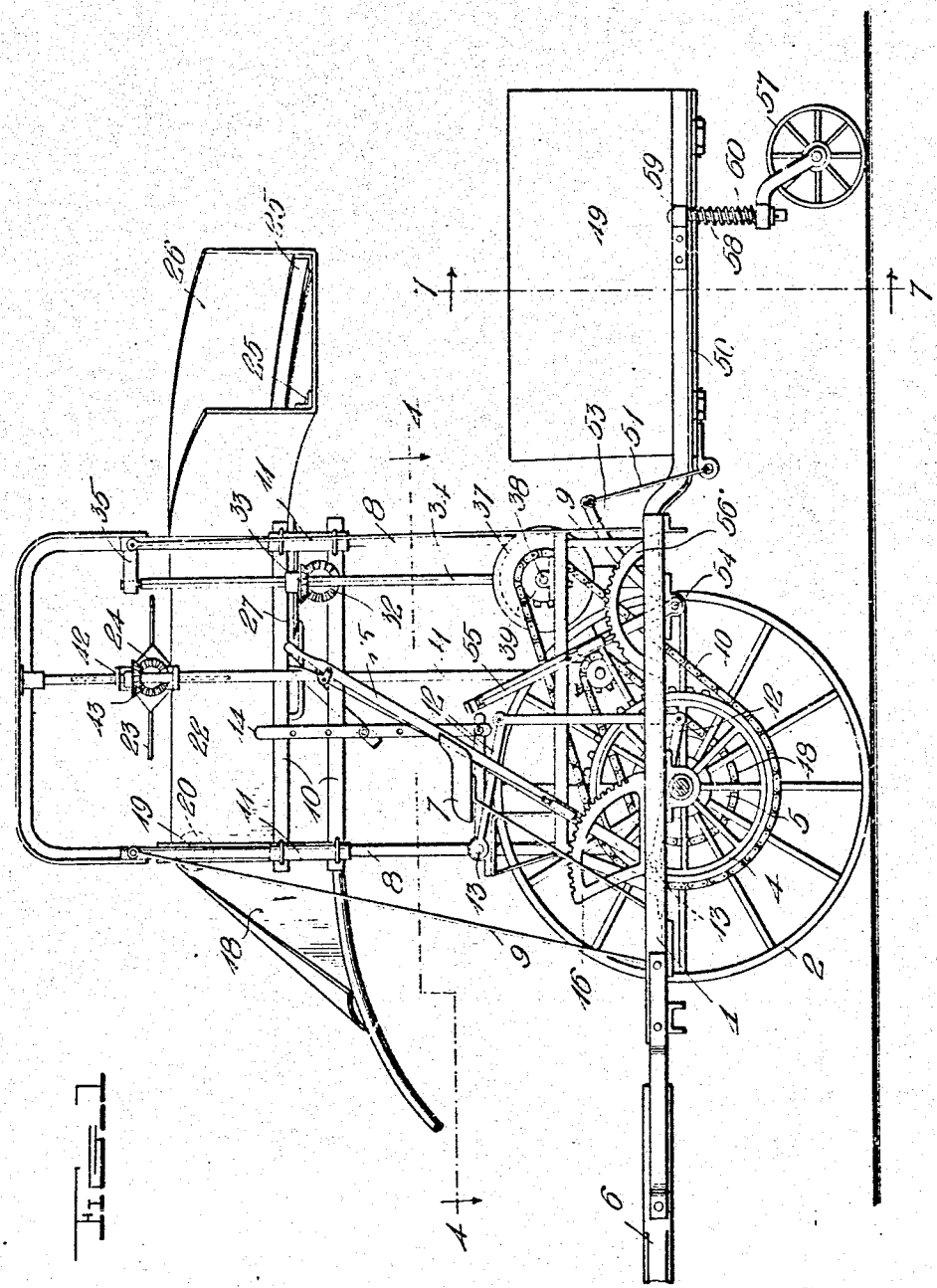
Witnesses
Inventor
J. E. Hail
by H. B. Willson & Co
Attorneys

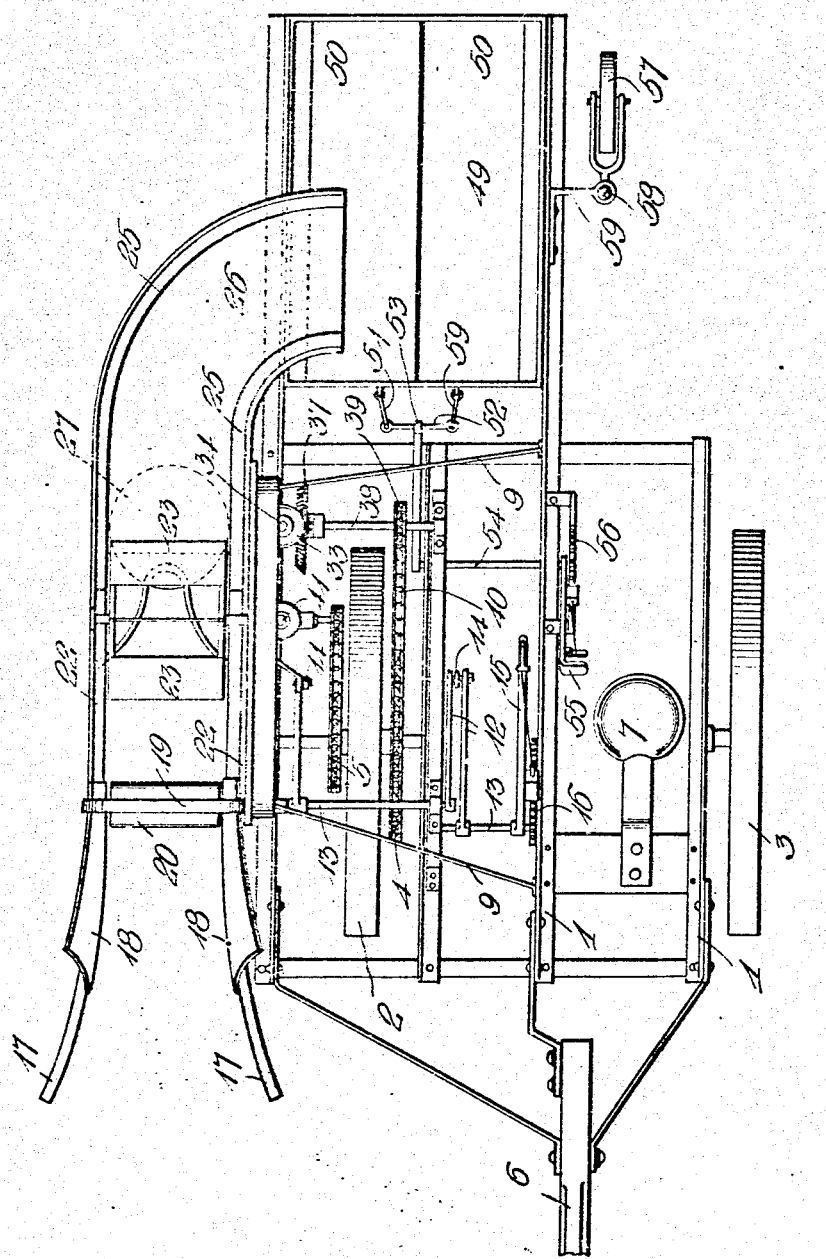

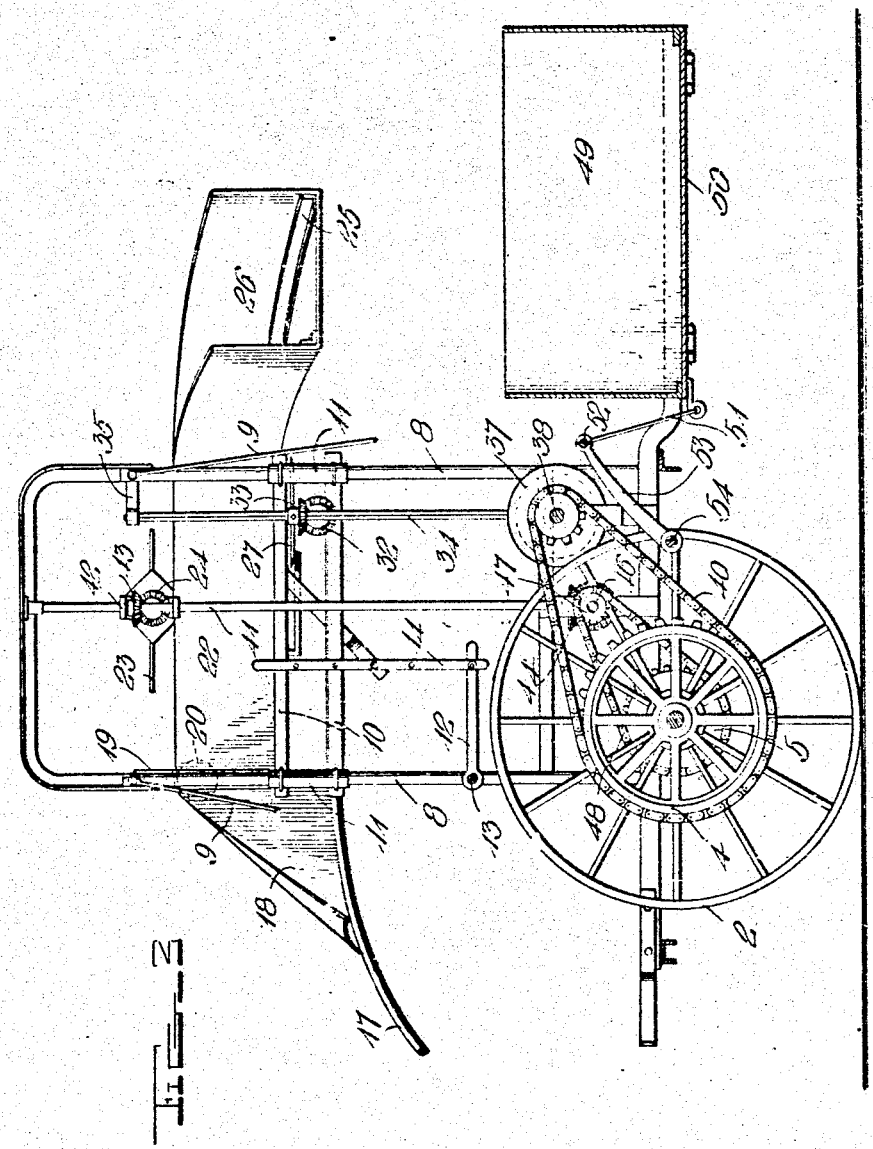

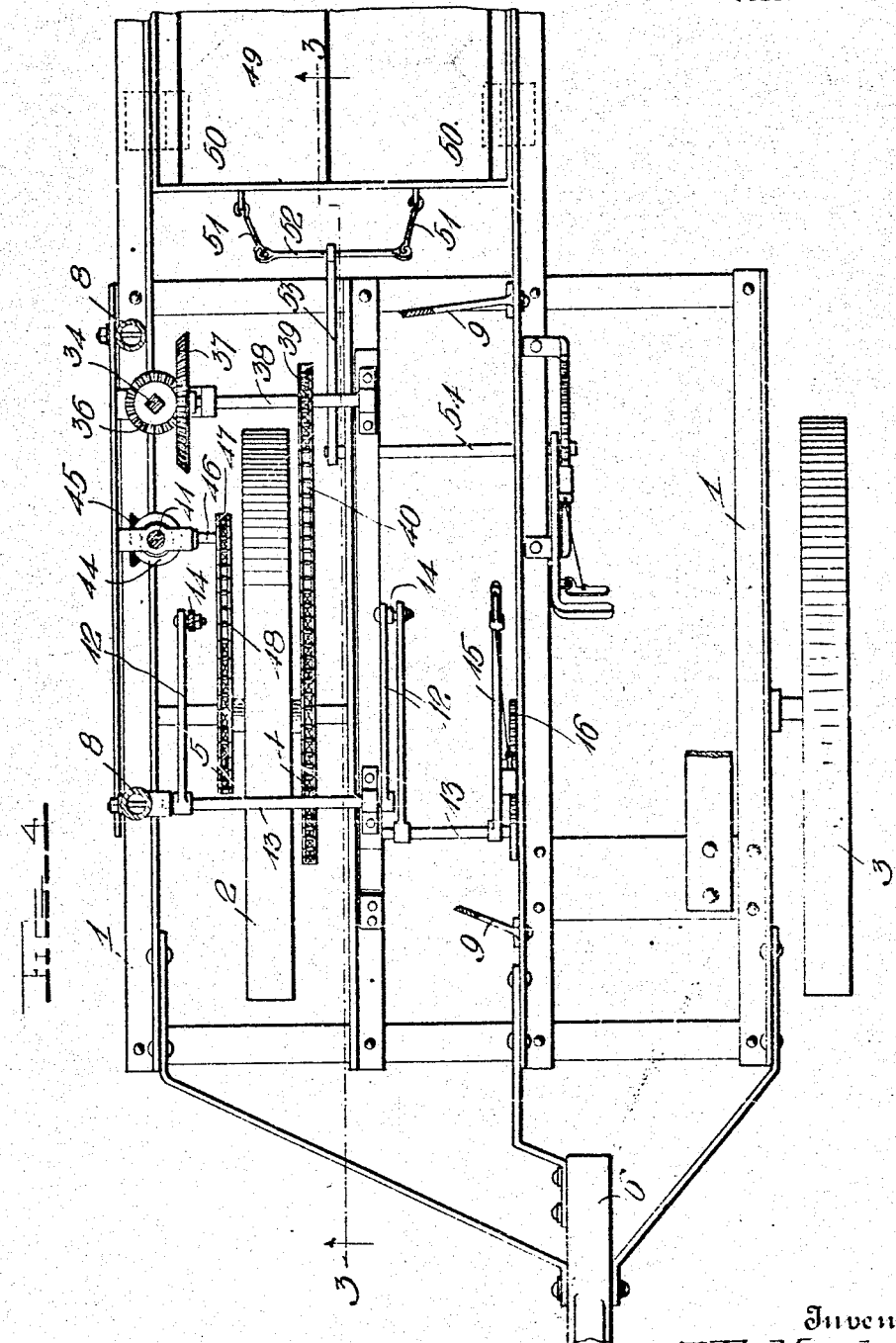

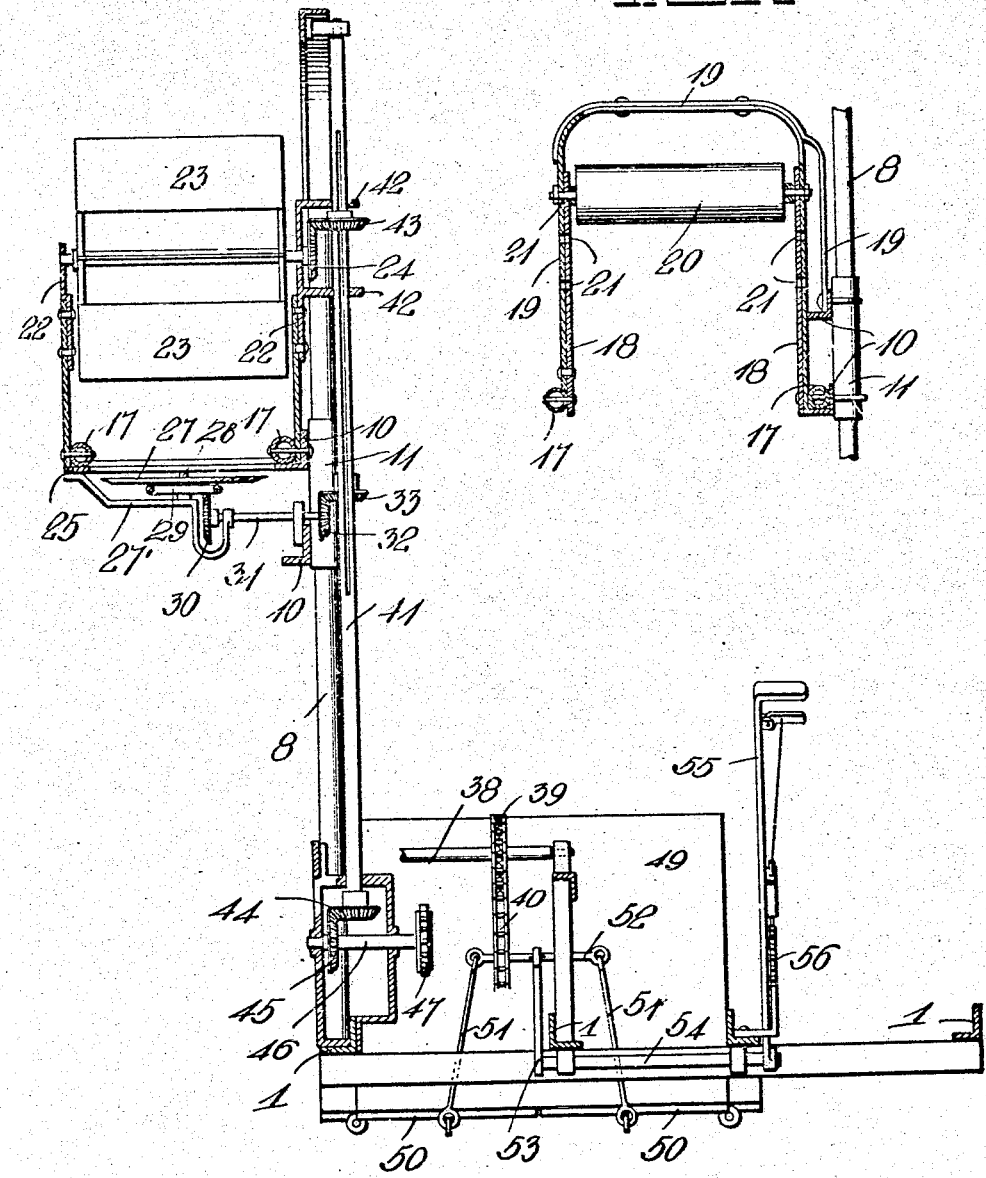

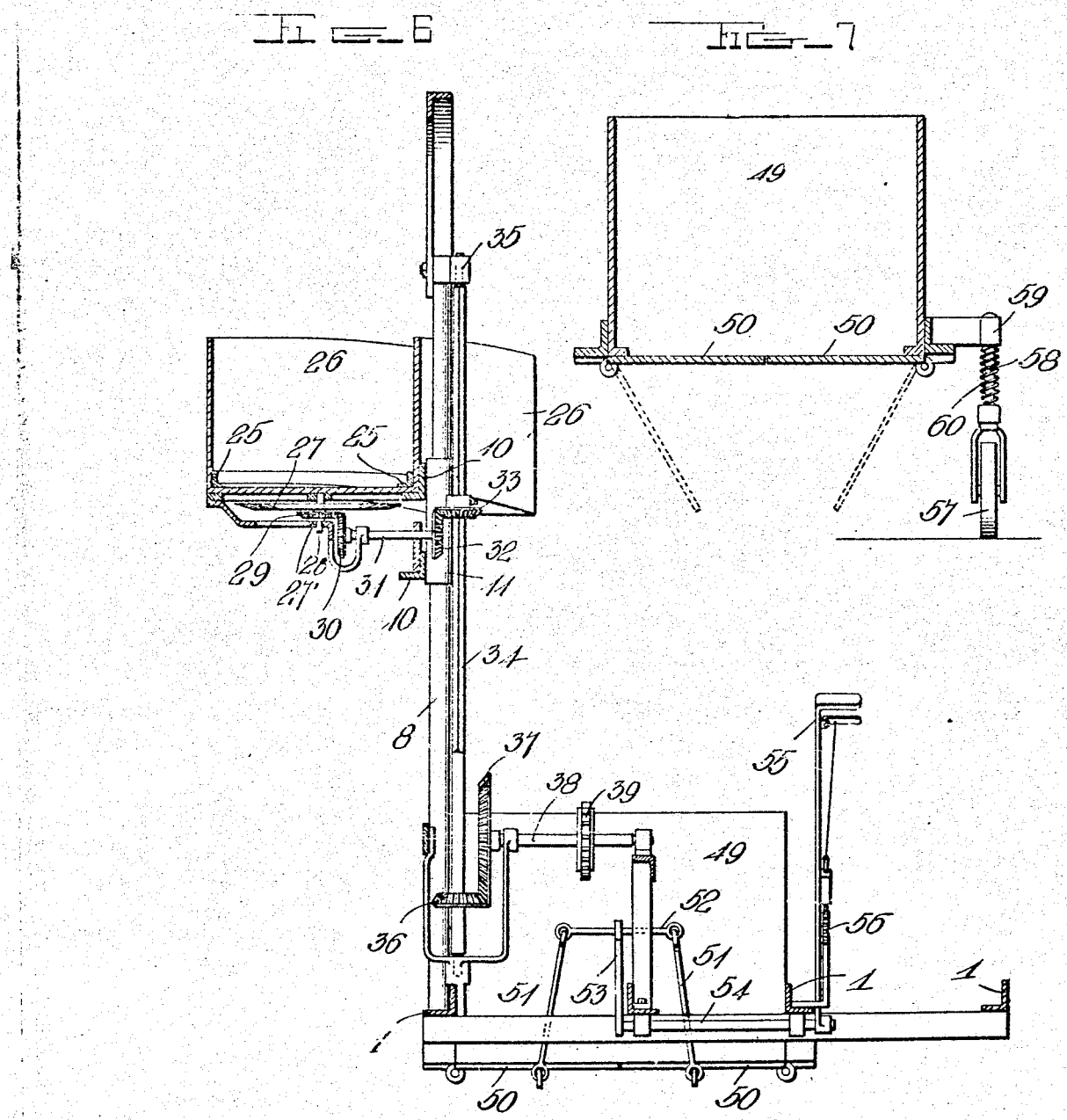

UNITED STATES PATENT OFFICE.

JOHN EDWARD HAIL, OF MERKEL, TEXAS.

HARVESTING-MACHINE.

968,655.   Specification of Letters Patent.   Patented Aug. 30, 1910.

Application filed December 30, 1908. Serial No. 525,666.

*To all whom it may concern:*

Be it known that I, JOHN EDWARD HAIL, a citizen of the United States, residing at Merkel, in the county of Taylor and State of Texas, have invented certain new and useful Improvements in Harvesting-Machines; and I do declare the following to be a full, clear, and exact description of the invention, such as will enable others skilled in the art to which it appertains to make and use the same.

This invention relates to improvements in machines for harvesting Kafir corn, maize and similar forms of grain.

One object of the invention is to provide an improved means for bending the heads of the corn and preventing the hanging or catching of the heads as they are passed to the severing mechanism.

Another object is to provide an improved construction of severing mechanism whereby the heads of the corn are severed without threshing the grain therefrom and means whereby the severing mechanism may be adjusted to cut or sever the heads from grain of different heights.

Still another object is to provide an improved means for receiving the severed heads of grain and means whereby the heads may be discharged from the receptacle when desired.

With the foregoing and other objects in view, the invention consists of certain novel features of construction, combination and arrangement of parts as will be more fully described and particularly pointed out in the appended claims.

In the accompanying drawings, Figure 1 is a side view of a harvesting machine constructed in accordance with my invention; Fig. 2 is a top plan view of the same; Fig. 3 is a vertical longitudinal section on the line 3—3 of Fig. 2 looking in the direction of the arrow; Fig. 4 is a horizontal sectional view on the line 4—4 of Fig. 1; Fig. 5 is a vertical cross sectional view taken on a line with the reel shaft; Fig. 6 is a similar view taken on a line with the rotary cutter shaft; Fig. 7 is a detail cross sectional view through the hopper on line 7—7 of Fig. 1. Fig. 8 is a similar view through the inner portion of the fender plates on a line with the grain engaging roller.

In the embodiment of the invention, I provide a main horizontally disposed supporting frame 1 in one side of which is arranged a driving and supporting wheel 2, and in the opposite side a supporting wheel 3. The wheel 2 is loosely mounted on its axle and has secured to its inner side a large sprocket gear 4 and to its outer side is secured a smaller sprocket gear 5. The purpose of the sprocket gears 4 and 5 will be hereinafter described. The frame 1 is provided with a draft tongue 6 and operator's seat 7 which may be of any suitable construction and arranged in any suitable manner.

On one side of the main frame 1 is secured an upwardly projecting vertically disposed supporting frame 8. The frame 8 is braced by suitably inclined brace bars 9 whereby a rigid support for the operating devices is provided.

Slidably mounted on the side bars of the frame 8 is a horizontally disposed carrying frame 10 which is provided to adjustably support the guiding and severing mechanism by means of which the heads are severed from the stalks and discharged into a suitable receptacle or hopper provided to receive the same. The frame 10 is here shown and preferably comprises parallel bars arranged between the upright bars of the frame 8 to which they are slidably connected by sleeves 11. The frame 10 is adjusted and held in its adjusted positions on the frame 8 by a suitable raising and lowering mechanism comprising a series of crank arms 12, rock shafts 13, and connecting bars 14 which are suitably arranged and supported on the main frame 1 of the machine. To one of the rock shafts 13 is fixedly connected a hand operating lever 15 provided with a pawl to engage a suitable rack 16 whereby the lever is secured to hold the frame 10 and its raising and lowering mechanism in their adjusted positions.

Secured to the frame 10 and projecting laterally from one side of the machine is a guiding and head severing mechanism comprising a pair of forwardly and downwardly extending guide arms 17 which diverge at their outer ends and serve to gather in the stalks of grain and direct the same toward the severing mechanism. On the inner portions of the arms 17 are arranged upwardly extending outwardly flaring fender plates 18 which also assist in guiding heads of grain to the cutting mechanism. The inner portions of the fender plates 18 are secured to and supported by a yoke or arch shaped bar 19, the lower ends of which are secured to the arms 17 as shown. Revolubly mounted in the yoke or arch shaped bar between the inner portions of the fender plates 18 is a grain engaging roller 20, the shaft of which is adapted to be engaged with a series of bearing apertures 21 formed in the sides of the arched bar 19, whereby the roller 20 may be adjustably secured to said bar.

Connected to the bars of the frame 10 on one side and to the outer guide arm 17 on the other side is an upwardly projecting reel supporting frame 22 in which is revolubly mounted a grain reel 23, the blades of which are adapted to be engaged with the heads of grain whereby the latter are forced back against the cutting device. On the inner end of the shaft of the reel 23 is fixedly mounted a beveled gear pinion 24, with which is engaged a reel operating mechanism hereinafter described. Connected to the frame 10 is a chute supporting frame 25 to which is secured a rearwardly and inwardly curved chute 26 by means of which the severed heads of the grain are conducted rearwardly and discharged into the hopper or receptacle provided to receive the same.

Revolubly mounted in a suitable bearing bracket 27 secured to the frame 10 immediately below the forward end of the chute 26 is a stalk cutting disk 27 by means of which the heads of grain are severed from the stalks when the latter are brought into engagement with the disk cutter. On the shaft 28 of the disk cutter immediately below the same is fixedly mounted a beveled gear pinion 29 which is engaged by a similar pinion 30 on the end of a short horizontally disposed shaft 31 journaled in the frame 10 and having on its opposite end a beveled gear pinion 32 which is in turn engaged by a beveled pinion 33 slidably mounted on a vertically disposed square operating shaft 34 revolubly mounted in suitable bearing brackets 35 secured to the frame 8, as shown.

On the lower end of the shaft 34 is fixedly mounted a beveled pinion 36 which is operatively engaged with the lower side of a beveled gear 37 fixed on the outer end of a suitably mounted horizontal shaft 38 on which is also fixed a sprocket gear pinion 39, which is connected by a sprocket chain 40 with the large sprocket gear 4 on the driving wheel 2 whereby the motion of said driving wheel is imparted to the cutter operating mechanism to turn the cutter at the proper speed.

The operating mechanism for the grain reel 23 comprises a vertically disposed shaft 41 which is mounted in suitable bearings on the frame 8 and has slidably mounted thereon a bracket 42 and a beveled gear pinion 43, which is operatively engaged with the beveled gear pinion 24 on the outer end of the reel shaft, whereby the motion of the shaft 41 is imparted to the reel. The gear pinion 43 is slidably keyed to the shaft 41 in any suitable manner to permit the pinion to be moved up and down thereon. By thus slidably connecting the pinion 43 with the shaft 41 and the pinion 33 with the shaft 34, said pinions may be readily moved up and down on the shafts when the frame 10 and guiding and severing mechanism are adjusted.

On the lower end of the shaft 41 is fixedly mounted a beveled gear pinion 44 which is operatively engaged with a beveled gear 45 fixed on a suitably mounted horizontal shaft 46, on which is also fixed a sprocket gear 47 which is connected by a sprocket chain 48 to the sprocket gear 5 secured to the outer side of the driving and supporting wheel 2 as shown, whereby the movement of said reel is imparted to the reel operating mechanism to drive the reel at the proper speed.

On the rear portion of the frame 1 is secured a suitable hopper or receptacle 49 to receive the heads of severed grain when discharged by the chute 26. The hopper or receptacle 49 may be of any suitable construction but is here shown and is preferably in the form of a rectangular box open on its upper side and provided on its lower side with double doors 50, which are hinged at their outer edges to the lower side edges of the hopper or to the frame parts supporting the same. By thus hingedly securing the doors 50, they are adapted to be swung upwardly and downwardly to closed and open positions respectively for the purpose of discharging the grain heads therefrom when the receptacle has been filled or at any other time.

In order to permit the driver to open and close the doors 50 at the desired time, I provide a suitable door operating mechanism comprising a pair of links 51, which are loosely connected at their lower ends to the forward ends of the doors and at their upper ends to a short rod 52 which is connected by a crank arm 53 to a rock shaft 54 journaled in the frame 1, as shown. To the opposite end of the rock shaft 54 is fixedly connected a hand operating lever 55 having a pawl adapted to be engaged with a segmental rack bar 56 whereby the lever 55 is secured in its adjusted positions to open and close the doors and to hold the same in closed position.

The rear end of the main frame 1 which supports the hopper or receptacle 49 is preferably supported by a caster wheel 57 which is pivotally connected to the lower end of a post 58 the upper end of which is slidably engaged with a bracket 59 secured to one side of the frame 1, as shown. Between the inner end of the forks or frame of the wheel and the bracket 59 is arranged a coiled spring 60 by means of which the rear end of the frame is yieldingly supported by the wheel 57, said yielding connection forming a cushion which will absorb the shocks and jars occasioned by the passage of the wheel 57 over rough surfaces or obstructions.

In the operation of the machine, the stalks of grain are gathered in by the guide arms 17 and fender plates 18 and when engaged by the roller 20, the heads will be bent or bowed downwardly so that the heads will all be cut a uniform length. After the heads are released from the roller, they are caught by the reel and passed back to the cutter 27 which quickly severs the same without shaking the grain therefrom, after which the severed heads are thrown back into the chute by the reel and from the chute are discharged into the hopper or receptacle from which they are discharged by the operator in the manner described. By revolubly mounting the head bending roller, the stalks or heads of the grain are prevented from hanging or catching in the guiding mechanism.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a machine of the class described, a wheeled supporting frame, a stalk guiding and severing mechanism adjustably mounted on said frame comprising a horizontally disposed revolubly mounted stalk cutter, a head bending roller revolubly mounted and vertically adjustable in said guiding mechanism at a point in advance of and in a plane above said cutter and a revolubly mounted reel arranged intermediately between said roller and cutter.

2. In a machine of the character described, a wheeled supporting frame, a guiding and severing mechanism mounted for vertical adjustment on said frame, said mechanism comprising a pair of guide arms, fender plates secured to said arms, a stalk engaging roller revolubly mounted between said fender plates, a revolubly mounted stalk cutter, a vertically disposed cutter operating shaft revolubly mounted in said frame, a beveled gear slidably mounted on said shaft, a train of power transmitting gears connected with said slidably mounted gear and with said cutter whereby the motion of said shaft is imparted to the cutter, a revolubly mounted head engaging reel adapted to pass the heads of grain from said roller to the cutter, an operating gear fixed on the shaft of said reel, a reel operating shaft revolubly mounted in said frame, a power transmitting gear slidably mounted on said shaft and adapted to engage the gear on said reel shaft whereby the reel is driven, and means whereby said cutter and reel operating shafts are driven from one of the supporting wheels of the machine.

3. In a machine of the character described, a wheeled supporting frame, a stalk guiding and severing mechanism adjustably mounted on said frame, a hopper carried by said frame to receive the severed heads of grain, a pair of doors adapted to open and close the lower end of said hopper, means to open and close said doors, said means comprising a pair of links loosely connected at one end to said doors, a bar to connect the upper ends of said links, a rock shaft, a crank arm to connect said shaft with the link connecting bar, a hand lever secured to said rock shaft whereby the latter is turned in one direction or the other to cause said crank arm to open or close said doors and locking mechanism whereby said lever and door operating mechanism is locked to hold the doors in closed position.

In testimony whereof I have hereunto set my hand in presence of two subscribing witnesses.

JOHN EDWARD HAIL.

Witnesses:
N. ROBERTS,
W. M. BROWN.